US009239828B2

(12) United States Patent
Yao et al.

(10) Patent No.: US 9,239,828 B2
(45) Date of Patent: Jan. 19, 2016

(54) RECURRENT CONDITIONAL RANDOM FIELDS

(71) Applicant: Microsoft Corporation, Redmond, WA (US)

(72) Inventors: Kaisheng Yao, Newcastle, WA (US); Geoffrey Gerson Zweig, Sammamish, WA (US); Dong Yu, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 39 days.

(21) Appl. No.: 14/201,670

(22) Filed: Mar. 7, 2014

(65) Prior Publication Data

US 2015/0161101 A1    Jun. 11, 2015

Related U.S. Application Data

(60) Provisional application No. 61/912,316, filed on Dec. 5, 2013.

(51) Int. Cl.
*G06F 17/27* (2006.01)
*G10L 15/16* (2006.01)
*G06N 3/02* (2006.01)

(52) U.S. Cl.
CPC .............. *G06F 17/2785* (2013.01); *G06N 3/02* (2013.01)

(58) Field of Classification Search
CPC .................................................. G06K 2209/09
See application file for complete search history.

(56) References Cited

U.S. PATENT DOCUMENTS

| 8,504,361 | B2 | 8/2013 | Collobert et al. |
| 2008/0120257 | A1* | 5/2008 | Goyal .................. G06F 17/243 7/243 |
| 2009/0089058 | A1 | 4/2009 | Bellegarda |
| 2011/0029517 | A1* | 2/2011 | Ji ...................... G06F 17/30864 707/734 |
| 2012/0072215 | A1 | 3/2012 | Yu et al. |
| 2014/0278355 | A1* | 9/2014 | Sarikaya ................ G06F 17/28 704/9 |
| 2014/0278985 | A1* | 9/2014 | Ramakrishnan ... G06Q 30/0256 705/14.54 |
| 2015/0066496 | A1* | 3/2015 | Deoras .................... G10L 15/16 704/232 |

OTHER PUBLICATIONS

Deoras, et al., "Deep Belief Network based Semantic Taggers for Spoken Language Understanding", In ISCA INTERSPEECH, Sep. 2013, pp. 2713-2717.

(Continued)

*Primary Examiner* — Satwant Singh
(74) *Attorney, Agent, or Firm* — Alin Corie; Sandy Swain; Micky Minhas

(57) ABSTRACT

Recurrent conditional random field (R-CRF) embodiments are described. In one embodiment, the R-CFR receives feature values corresponding to a sequence of words. Semantic labels for words in the sequence of words are then generated and each label is assigned to the appropriate one of the words in the sequence of words. The R-CRF used to accomplish these tasks includes a recurrent neural network (RNN) portion and a conditional random field (CRF) portion. The RNN portion receives feature values associated with a word in the sequence of words and outputs RNN activation layer activations data that is indicative of a semantic label. The CRF portion inputs the RNN activation layer activations data output from the RNN for one or more words in the sequence of words and outputs label data that is indicative of a separate semantic label that is to be assigned to each of the words.

20 Claims, 5 Drawing Sheets

(56) References Cited

OTHER PUBLICATIONS

Do, Trinh-Minh-Tri, et al., "Neural Conditional Random Fields", In Proceedings of the 13th International Artificial Intelligence and Statistics, May 13, 2010, pp. 177-184.

Fernández, et al., "Sequence Labelling in Structured Domains with Hierarchical Recurrent Neural Networks", In Proceedings of the 20th International Joint Conference on Artificial Intelligence, Jan. 6, 2007, pp. 774-779.

Graves, Alex, "Supervised Sequence Labelling with Recurrent Neural Networks", Studies in Computational Intelligence 385, Springer 2012, pp. 1-131.

Mesnil, et al., "Investigation of Recurrent-Neural-Network Architectures and Learning Methods for Spoken Language Understanding", In INTERSPEECH, Aug. 2013, pp. 3771-3775.

Mohamed, et al., "Investigations of Full-Sequence Training of Deep Belief Networks for Speech Recognition", In Proceeding of 11th Annual Conference of the International Speech Communication Association, Sep. 26, 2010, pp. 2846-2849.

Peng, et al., "Conditional Neural Fields", In Proceedings of Neural Information Processing Systems, Dec. 2009, pp. 1419-1427.

Shetty, et al., "Handwritten Word Recognition using Conditional Random Fields", In Ninth International Conference on Document Analysis and Recognition, Sep. 23, 2007, pp. 1098-1102.

Xu, et al., "Convolutional Neural Network Based Triangular CRF for Joint Intent Detection and Slot Filling", 2013 IEEE Workshop on Automatic Speech Recognition and Understanding, Dec. 8-12, 2013, ASRU 2013, Olomouc, Czech Republic, pp. 78-83.

Yao, et al., "Recurrent Neural Networks for Language Understanding", In Proceedings of Conference of Interspeech, Aug. 2013, pp. 2524-2528.

\* cited by examiner

RECURRENT CONDITIONAL RANDOM FIELDS

CROSS REFERENCE TO RELATED APPLICATION

This application claims the benefit of and priority to provisional U.S. patent application Ser. No. 61/912,316 filed Dec. 5, 2013.

BACKGROUND

Recurrent neural networks (RNNs) have recently produced record setting performance in language modeling and word-labeling tasks. In the word-labeling task a RNN tagger is used analogously to the more traditional conditional random field (CRF) to assign a label to each word in an input sequence. In contrast to CRFs, RNNs operate in an online fashion to assign labels as soon as a word is seen, rather than after seeing the whole word sequence.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Recurrent conditional random field (R-CRF) embodiments described herein are generally applicable in one embodiment to a computerized language understanding (LU) system. In one exemplary embodiment, the R-CRF is implemented as a computer program having program modules executable by a computing device. These program modules direct the computing device to first receive feature values corresponding to a sequence of words. Semantic labels for words in the sequence are then generated and each label is assign to the appropriate one of the words. The R-CRF used to accomplish these tasks includes a recurrent neural network (RNN) portion and a conditional random field (CRF) portion. The RNN portion receives feature values associated with a word in the sequence of words and outputs RNN activation layer activations data that is indicative of a semantic label. The CRF portion inputs the RNN activation layer activations data output from the RNN for one or more words in the sequence of words and outputs label data that is indicative of a separate semantic label for each of the words.

With regard to the RNN portion of the R-CRF, in one exemplary embodiment it includes an input layer, a hidden layer and an activation layer. The input layer includes nodes, as do the hidden and activation layers. Each feature value associated with a word is input into a different node of the input layer. The hidden layer nodes receive outputs from the input layer. These outputs from the input layer are adjustably weighted. The activation layer receives outputs from the hidden layer. These outputs from the hidden layer are also adjustably weighted.

The adjustable weights of the input and hidden layer outputs are set so that the R-CRF generates the correct semantic labels for words in a sequence of words. Setting the aforementioned outputs involves a computer-implemented training process. In one exemplary training embodiment, setting the weights involves first accessing a set of training data pair sequences. Each of these training data pair sequences includes pairs of feature values corresponding to a word and label data that is indicative of a correct semantic label for that word. Each training data pair sequence of the set is input one by one into the R-CRF. For each training data pair sequence input, a CRF sequence-level objective function and a back-propagation procedure are employed to compute adjusted weights for the connections between layers of the RNN portion of the R-CRF. The weight associated with the connections between the layers of the RNN portion of the R-CRF are changed based on these computed adjusted weights.

DESCRIPTION OF THE DRAWINGS

The specific features, aspects, and advantages of the disclosure will become better understood with regard to the following description and accompanying drawings where.

DETAILED DESCRIPTION

Figure 1:
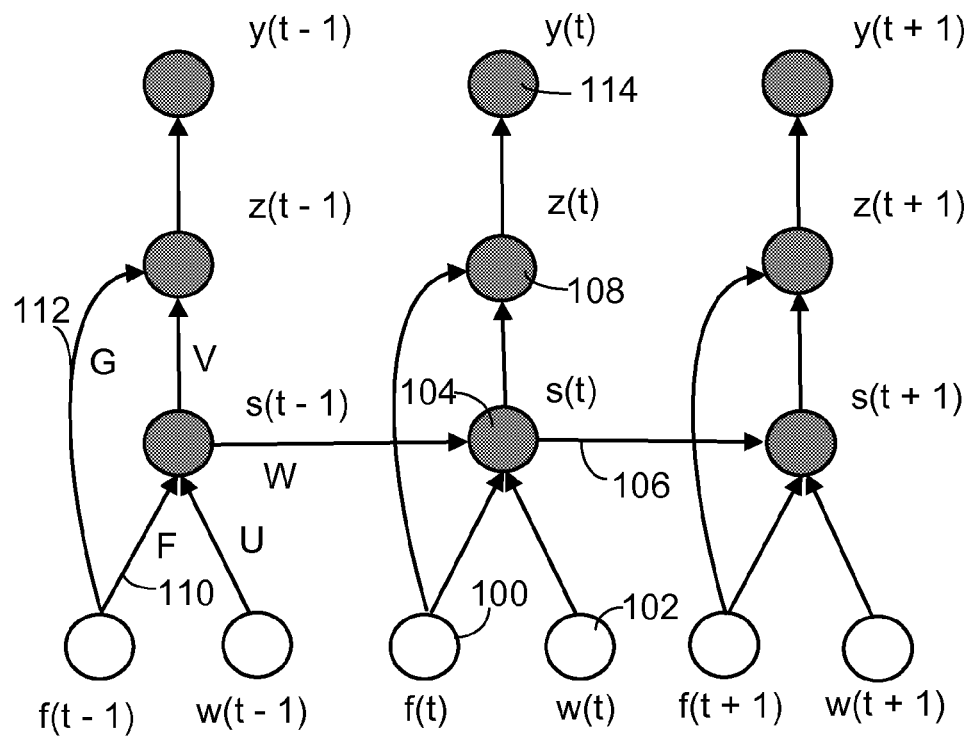
FIG. 1 is a simplified diagram of the basic architecture of a recurrent neural network for language understanding (RNN-LU) which is "unrolled" across time to cover three consecutive word inputs.

In the following description of recurrent conditional random field (R-CRF) embodiments reference is made to the accompanying drawings which form a part hereof, and in which are shown, by way of illustration, specific embodiments in which the R-CRF may be practiced. It is understood that other embodiments may be utilized and structural changes may be made without departing from the scope of the R-CRF.

It is also noted that for the sake of clarity specific terminology will be resorted to in describing the R-CRF embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the R-CRF. The appearances of the phrases "in one embodiment", "in another embodiment", "in an exemplary embodiment", "in an alternate embodiment", "in one tested embodiment", "in one implementation", "in another implementation", "in an exemplary implementation", "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the R-CRF does not inherently indicate any particular order nor imply any limitations thereof.

1.0 Recurrent Conditional Random Field (R-CRF)

As described previously, recurrent neural network (RNN) taggers or conditional random fields (CRFs) are used to assign a label to each word in an input sequence during a word-labeling task. The recurrent conditional random field (R-CRF) embodiments described herein incorporate elements of the CRF model into a RNN tagger. The resulting tagger exhibits a performance that exceeds either a RNN or CRF alone. In the sections to follow, the basic RNN and CRF models are described in more detail. Then, various R-CRF embodiments are described.

1.1 Recurrent Neural Networks (RNNs)

In recent years, RNNs have demonstrated outstanding performance in a variety of natural language processing tasks. In common with feed-forward neural networks, an RNN maintains a representation for each word as a high-dimensional real-valued vector. Critically, in this vector space, similar words tend to be close with each other, and relationships between words are preserved; thus, adjusting the model parameters to increase the objective function for a training example which involves a particular word tends to improve performance for similar words in similar contexts.

In classical language understanding (LU) systems, one of the key tasks is to label words with semantic meaning. For example, in the sentence "I want to fly from Seattle to Paris," the word "Seattle" should be labeled as the departure-city of a trip, and "Paris" as the arrival-city. Perhaps the most obvious approach to this task is the use of the aforementioned CRFs, in which an exponential model is used to compute the probability of a label sequence given the input word sequence. A CRF produces the single, globally most likely label sequence, and the model has been widely used in LU.

More recently, RNNs have been used in LU systems. In one case, such a RNN has been dubbed a RNN-LU. This architecture includes a layer of inputs connected to a set of hidden nodes; a fully connected set of recurrent connections amongst the hidden nodes; and a set of output nodes. In the LU task, the inputs are the sequence of words, and the outputs are the sequence of semantic labels. This basic architecture is illustrated in FIG. 1. An open circle indicates that the value of the variable is given. Matrices and feature functions are shown in bold. w(t) represents word input, f(t) represents ancilliary features, and y(t) represents the output label sequence. The architecture is "unrolled" across time to cover three consecutive word inputs.

More particularly, the RNN-LU architecture is a feature-augmented architecture. This architecture consists of a feature layer 100, an input layer 102, a hidden layer 104 with recurrent connections 106, an activations layer 108 and an output layer 114. Each layer represents a set of neurons (sometimes also referred to as nodes), and the layers are connected with weights. The input layer 102 represents an input word at time t encoded using 1-of-N coding, and the feature layer 100 can be used to encode additional information such as topic, or dialog state. To use greater context, the input layer 102 can also accept an "n-hot" representation in which there is a non-zero value for not just the current word, but the surrounding n−1 words as well. The feature layer 100 encodes side-information, and is connected to the hidden layer 104 with weights F 110 and the activation layer 108 with weights G 112. Besides encoding topical information, the feature layer 100 can also be used to convey a redundant representation of the input by using continuous-space vector representations of the words. Such representations can be learned by a non-augmented network (in which the input layer only connects to the hidden layer).

The activation layer 108 produces activations for each possible label. The hidden layer 104 maintains a representation of the sentence history. The input vector w(t) has a dimensionality equal to or larger than the vocabulary size, and the output vector y(t) of the output layer 114 has a dimensionality equal to the number of possible semantic labels, and produces a probability distribution over the labels. It is related to the activations layer 108 via a softmax operation. The values in the hidden 104 and activation layers 108 are computed as follows:

$$s(t) = f(Uw(t) + Ws(t-1) + Ff(t)) \quad (1)$$

$$y(t) = g(Vs(t) + Gf(t)), \quad (2)$$

where $$f(z) = \frac{1}{1+e^{-z}}, \; g(z_m(t)) = \frac{e^{z_m(t)}}{\sum_k e^{z_k(t)}}. \quad (3)$$

and U, W, F, V, and G are the connection weights. $z_m(t)$ is the m-th element in the activation layer activity before softmax; i.e., $z_m(t)=(Vs(t)+Gf(t))_m$. This model uses an on-line decoding process that outputs one-hot prediction of semantic labels based on only the past observations.

The RNN model is trained with the maximum conditional likelihood criterion, whose error signal for error back-propagation is $$\delta(y(t) = k) - \frac{\exp(z_{y(t)}(t))}{\sum_j \exp(z_j(t))},$$

where k represents the correct label.

1.2 Conditional Random Fields (CRFs)

The RNN produces a position-by-position distribution over output labels, and thus can suffer from label bias. In contrast, a CRF is a sequence model consisting of a single exponential model for the joint probability of the entire sequence of labels given the observation sequence. The joint probability has the form:

$$p_\theta(y(1:T) \mid w(1:T)) \propto \quad (4)$$

$$\exp\left(\sum_{t=1}^T \sum_m \lambda_m f_m(y(t-1), y(t)) + \sum_{t=1}^T \sum_k \mu_k g_k(y(t), w(t))\right)$$

where $f_m(y(t-1), y(t))$ is the m-th edge feature between labels y(t−1) and y(t), and $g_k(y(t), w(t))$ is the k-th vertex feature at position t. In the CRF, the edge and vertex features are assumed to be constant, given and fixed. For example, a Boolean vertex feature $g_k$ might be true if the word at position t is upper case and the label y(t) is "proper noun".

Figure 2:
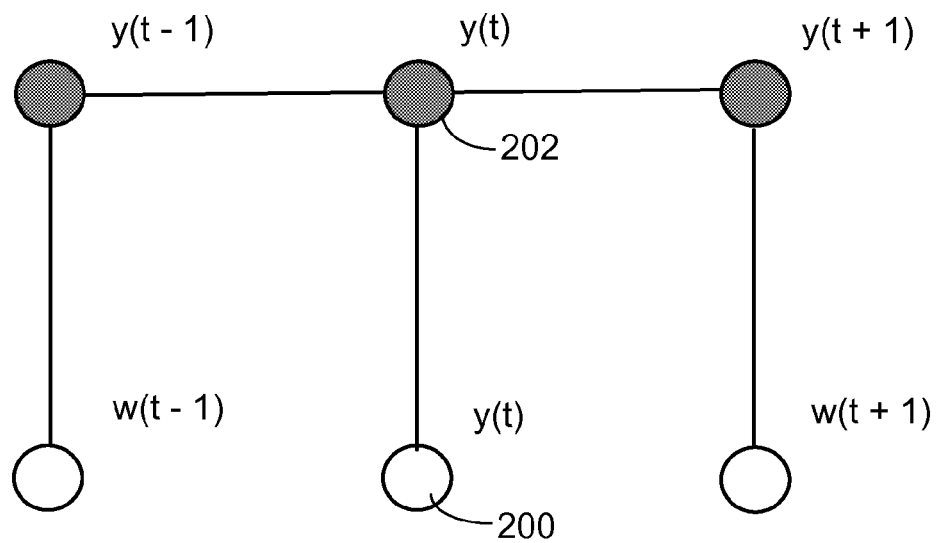
FIG. 2 is a simplified diagram of the basic architecture of a linear chain conditional random field (LC-CRF) which is "unrolled" across time to cover three consecutive word inputs.

Referring to FIG. 2, the basic architecture of a linear chain CRF (LC-CRF) is shown. This type of CRF exhibits a dependence between labels in neighboring positions. As before, an open circle indicates that the value of the variable is given. Matrices and feature functions are shown in bold, w(t) represents word input that is input into the input layer 200, and y(t) represents the output label sequence 202. The architecture is "unrolled" across time to cover three consecutive word inputs. It is noted that in another embodiment, a Semi-Markov CRF (semi-CRF) is employed instead. The semi-CRF uses a segment-level model, grouping together multiple inputs and assigning a single output label.

1.3 Recurrent Conditional Random Field (R-CRF) Model, Objective Function and Training Recurrent conditional random field (R-CRF) embodiments described herein generally represent a specialized combination of a RNN and CRF. The combined model can be considered as an RNN that uses the CRF-like sequence-level objective function, or as a CRF that uses the RNN activations as features. The whole model is jointly trained, taking advantage of the sequence-level discrimination ability of a CRF and the feature learning ability of an RNN.

Figure 3:
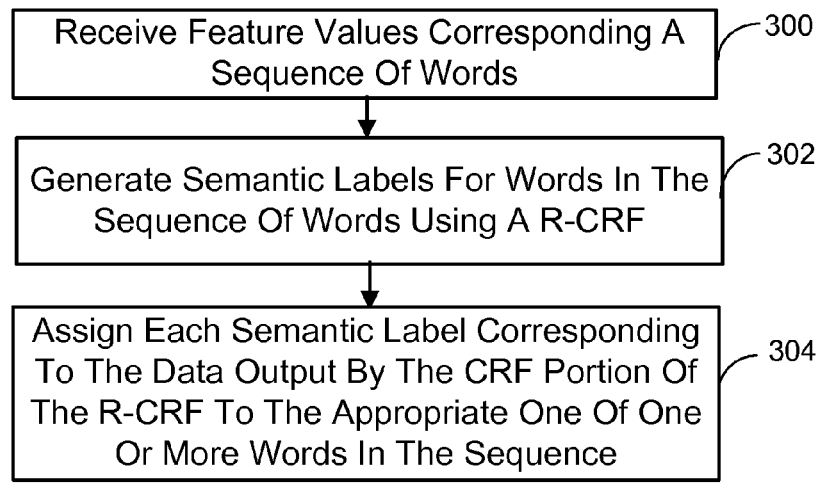
FIG. 3 is a flow diagram generally outlining one embodiment of a process for using a recurrent conditional random field (R-CRF) in a language understanding (LU) system.

In one embodiment, the R-CRF is employed in a language understanding (LU) system that includes a computing device (such as a computing device described in the Exemplary Operating Environments section to follow), and a computer program having program modules executable by the computing device. Referring to FIG. 3, in one implementation, the computing device is directed by the program modules of the computer program to first receive feature values corresponding a sequence of words (block 300). Semantic labels are then generated for words in the sequence of words using an R-CRF (block 302). In general, the R-CRF includes a recurrent neural network (RNN) portion which generates RNN activation layer activations data that is indicative of a semantic label for a word, where the RNN receives feature values associated with a word in the sequence of words and outputs RNN activation layer activations data that is indicative of a semantic label. It also includes a conditional random field (CRF) portion that takes as input the RNN activation layer activations data output from the RNN for one or more words in the sequence of words. It then outputs label data that is indicative of a separate semantic label that is to be assigned to each of the one or more words in the sequence of words associated with the RNN activation layer activations data. In view of this, in block 304, each semantic label corresponding to the data output by the CRF portion of the R-CRF is assign to the appropriate one of the one or more words in the sequence.

1.3.1 R-CRF Model

Figure 4:
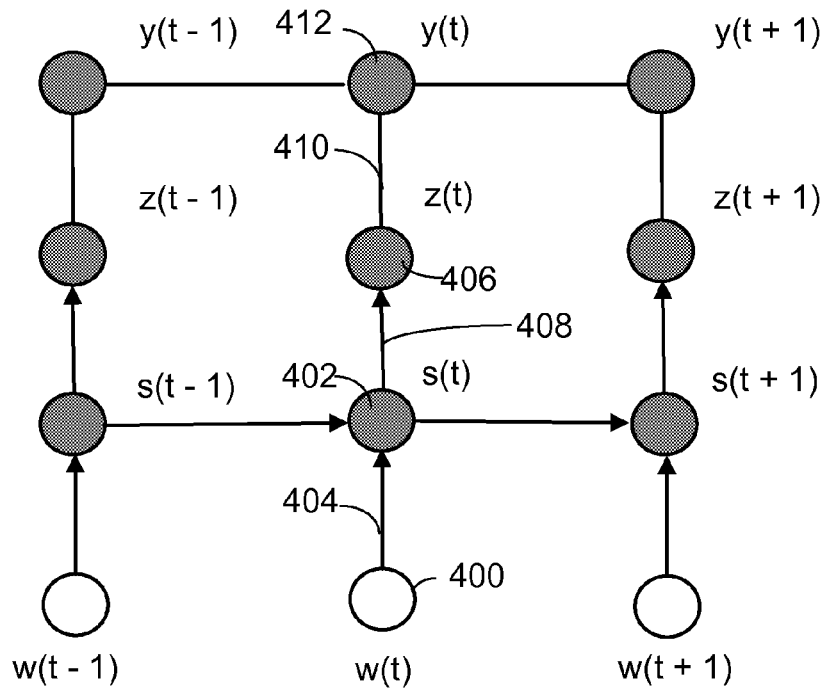
FIG. 4 is a simplified diagram of the basic architecture of one embodiment of the R-CRF which is "unrolled" across time to cover three consecutive word inputs.
Figure 5:
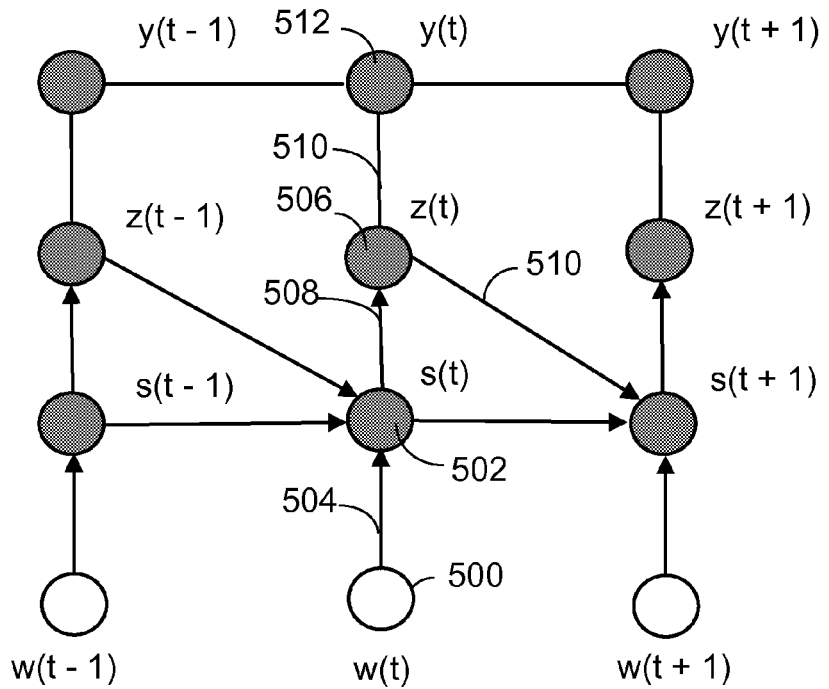
FIG. 5 is a simplified diagram of the basic architecture of another embodiment of the R-CRF which is "unrolled" across time to cover three consecutive word inputs.

In the R-CRF model, an RNN is used to generate the input features for a CRF. Two different architectures implementing this model are shown in FIGS. 4 and 5. In this case, an open circle indicates that the variable is not generated by the model. The architectures are "unrolled" across time to cover three consecutive word inputs. In both variants, the features used are the RNN scores before softmax normalization (e.g., activation of activation layer 108 of FIG. 1); i.e., at each position t for a label k, the new model uses $z_k(t)$ in Eq. (3) that is before softmax. In addition, in both variants there is an input layer of nodes 400/500. Each feature value associated with a word is input into a different input layer node. A hidden layer 402/502 includes nodes that are connected to outputs 404/504 of the input layer, where each connection between the input layer 400/500 and hidden layer is adjustably weighted. An activation layer 406/506 has nodes that are connected to 408/508 of the hidden layer, where each connection between the hidden layer 402/502 and activation layer is also adjustably weighted. The outputs of the activation layer 410/510 (which are the previously-described RNN activation layer activations data) are connected to inputs of the CRF portion 412/512 of the R-CRF. It is noted that in one implementation, the hidden layer is fully-connected to the input layer and activation layer such that each node of the hidden layer is connected to each node of the input layer and each node of the activation layer.

An R-CRF naturally incorporates dependencies between semantic labels via the CRF transition features. In addition, in the implementation shown in FIG. 5, the past one-hot prediction from an on-line decoding process is connected to the hidden layer. In other words, the RNN activations 510 output from the RNN portion of the R-CRF in response to the input of feature values associated with a word in the aforementioned sequence of words is input into the nodes of the hidden layer 502 along with the data output 504 from the input layer upon the input of feature values associated with a next word in the sequence of words input into the input layer 500. The RNN activation layer activations data 510 inputs into the nodes of the hidden layer 502 is adjustably weighted prior to input. The prediction is simply the maximum of the distribution over output labels at time t, given only the observations up to time t. Thus, the one-hot predictions contribute to the subsequent activation layer via a non-linear hidden layer.

Figure 6:
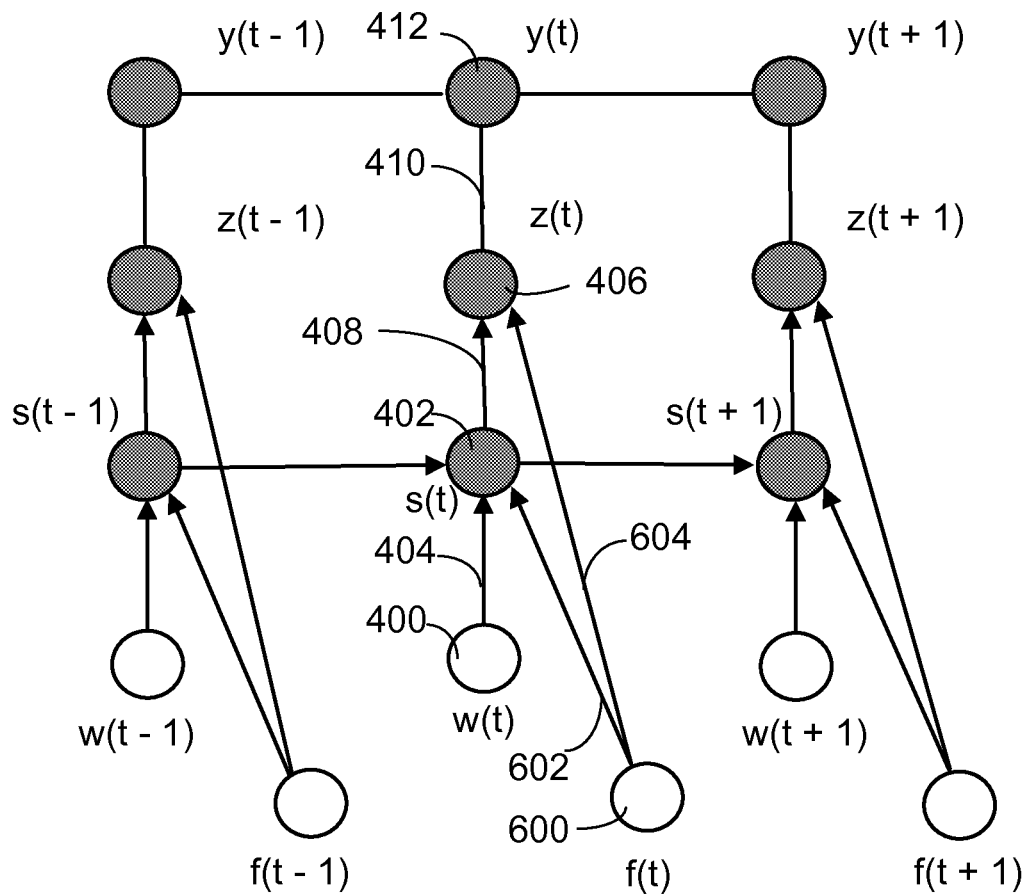
FIG. 6 is a simplified diagram of the basic architecture of one embodiment of the R-CRF which is "unrolled" across time to cover three consecutive word inputs, where the architecture of FIG. 4 has been modified to include feature layer inputs and connections.

It is noted that for the sake of clarity, the optional feature layer inputs and connections are not shown in the exemplary architectures of FIGS. 4 and 5, however can be included as desired. FIG. 6 shows an exemplary embodiment where the feature layer inputs and connections have been included in the architecture of FIG. 4. A similar arrangement is also possible for the architecture of FIG. 5, but is not shown. In general, the above-described architecture of FIG. 4, is repeated with the addition of a feature layer of nodes 600. Each feature value associated with ancillary information it is desired to input to the R-CRF is input into a different one of the feature layer nodes 600. In response, the feature layer nodes 600 each outputs representative ancillary data to an input of each hidden layer node 402 via a weighted hidden layer connection 602 and to an input of each activation layer node 410 via a weighted activation layer connection 604.

It is further noted that more than one hidden layer can be employed in the R-CRF architectures. More particularly, in one embodiment, the RNN portion of the R-CRF further includes one or more additional hidden layers, each of which is fully connected to the layer preceding the additional hidden layer and the layer subsequent to the additional hidden layer. In this way, each node of each additional hidden layer is connected to each node of the preceding layer and each node of the subsequent layer. The additional hidden layers are initialized and trained at the same time as the first hidden layer.

Most of the computational cost in the R-CRF occurs between hidden, feature, and activation layers, as input to hidden layer computation can be done by a simple table look-up. Denote the dimensions of feature layer, hidden layer and activation layer respectively as F, H, and Y. The computational cost is O(HH+FH+HY+FY) for each word. The cost of Viterbi decoding is O(T(HH+FH+HY+FY)) for a sequence with length T.

1.3.2 Objective Function

For simplicity of notation, an input-label pair sequence is denoted as (w(1:t),y(1:t)). This can be easily generalized to include the side feature inputs as ((w(1:t),f(1:t)),y(1:t)). The CRF definition of Eq. (4) is simplified by absorbing the weight $\mu_k$ associated with a feature $g_k$ into the feature itself (in this case the weights in the final layer of the network). This allows $\mu_k$ to be defined as 1 without a loss in generality. With this notation, in one embodiment the desired CRF sequence-level objective function is defined as:

$$\frac{\exp\sum_{t=1}^{T}(\eta a_{y^*(t-1)y^*(t)} + z_{y^*(t)}(t))}{\sum_{\forall y(1:T)} \exp\left(\sum_{t=1}^{T} \eta a_{y(t-1)y(t)} + z_{y(t)}(t)\right)}, \quad (5)$$

where y(1: T)=[y (1) . . . y (T)] denotes label sequences, y*(1:T)=[y*(1) . . . y*(T)] denotes the correct label sequence, $a_{y(t-1)y(t)}$ is a transition factor between the label of the sequence currently being considered and the previous label in the sequence, $a_{y^*(t-1)y^*(t)}$ is a transition factor between the label of the correct sequence currently being considered and the previous label in the correct sequence, $z_{y(t)}(t)$ is the RNN activation layer activations data output by the RNN portion in response to the input of feature values associated with a word, and $z_{y^*(t)}(t)$ is the RNN activation layer activations data output by the RNN portion in response to the input of feature values associated with the word corresponding to the label of the correct sequence currently being considered. $\eta \in R^+$ is a real value, which in one implementation is set to 1.0.

It may be convenient to represent the above objective function in log-scale, which is:

$$Q(\theta) = \qquad (6)$$
$$\sum_{t=1}^{T}(\eta a_{y^*(t-1)y^*(t)} + z_{y^*(t)}(t)) - \log \sum_{\forall y(1:T)} \exp\left(\sum_{t=1}^{T} \eta a_{y(t-1)y(t)} + z_{y(t)}(t)\right).$$

To maximize the above objective function, it is iterated between a forward pass and a backward pass during training. The training and decoding procedures will now be described.

1.3.3 R-CRF Training

The RNN and CRF portions of the R-CRF are jointly trained using a set of training data pair sequences and the above-described CRF sequence-level objective function. Each training data pair in each sequence of the set includes feature values corresponding to a word and label data that is indicative of a correct semantic label for that word.

Figure 7:
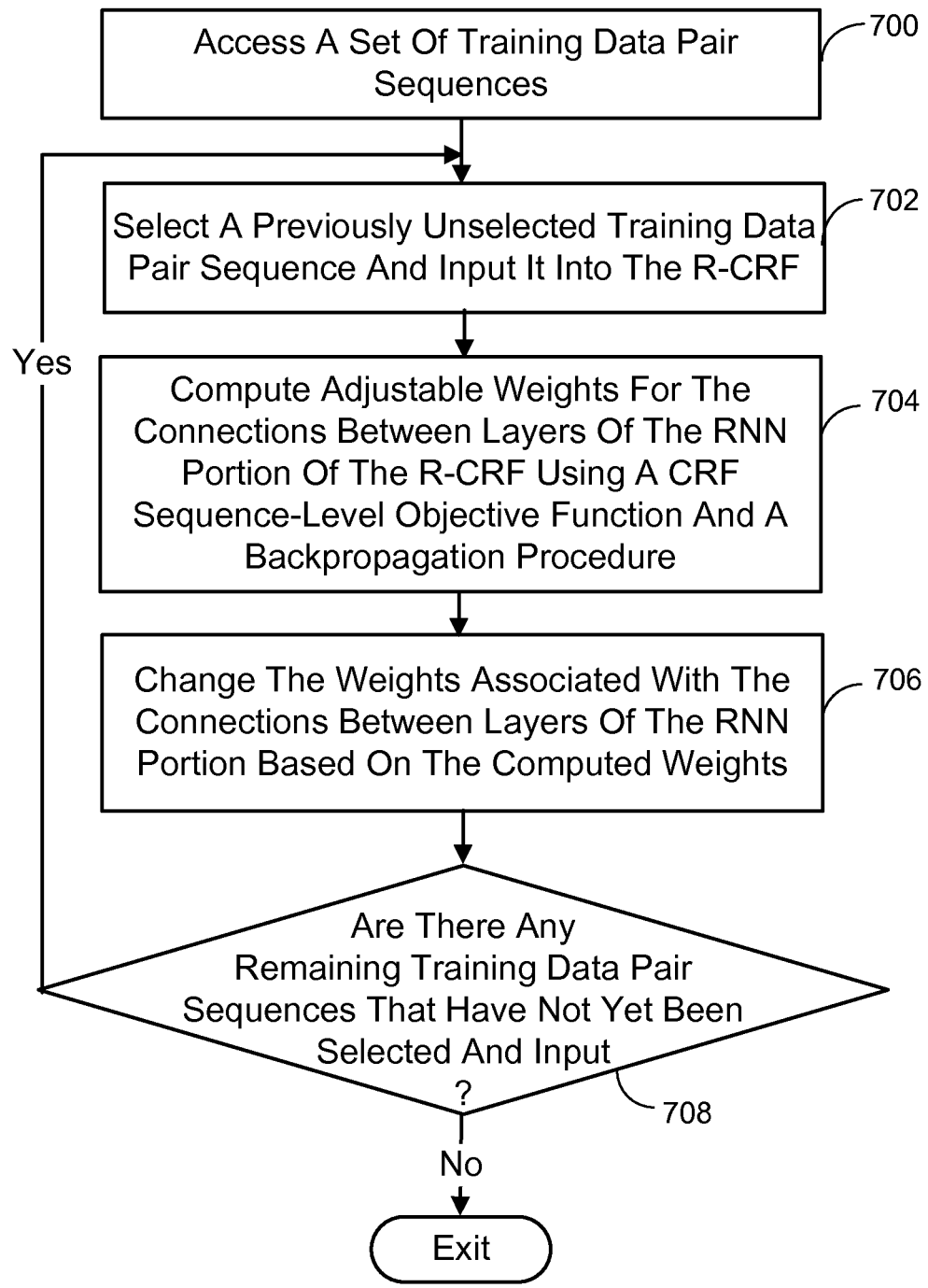
FIG. 7 is a flow diagram generally outlining one embodiment of a process for training an R-CRF in a LU system.

In one general embodiment shown in FIG. 7, training an R-CRF employs a computing device to perform the following process actions. First, a set of training data pair sequences is accessed (block 700). A previously unselected training data pair sequence of the set is then selected and input into the R-CRF (block 702). A CRF sequence-level objective function and a backpropagation procedure (as will be described in more detail in the description to follow) is employed to compute adjustable weights for the connections between layers of the RNN portion of the R-CRF (block 704). The weights associated with the connections between layers of the RNN portion are then changed based on these computed adjustable weights (block 706). It is next determined if there are any remaining training data pair sequences that have not yet been selected and input (block 708). If there are, then blocks 702 through 708 are repeated. Otherwise, the training iteration ends. Typically, the foregoing training iteration would be repeated as will be described in more detail in the paragraphs to follow.

In one embodiment, the aforementioned use of the CRF sequence-level objective function and a backpropagation procedure to compute adjusted weights for the connections between layers of the RNN portion of the R-CRF is accomplished as follows. The aforementioned forward pass computes the scores along all possible input-label pair sequences in the denominator in Eq. (5) and the score along the correct input-label pair sequence. The latter score is trivial to obtain. However, to compute the scores of all input-label pair sequences, a naive implementation would require a computational cost of $O(N^T)$, where N is the number of slots. As such, in one implementation, the necessary quantities are computed using dynamic programming techniques.

Define $\alpha(t, i)$ as the sum of partial path scores ending at position t, with label i. This can be computed as follows:

$$\alpha(t, i) = \sum_{\forall y(1:t) \cap y(t)=i} \exp\left(\sum_{k=1}^{t}(\eta a_{y(k-1)y(k)} + z_{y(k)}(k))\right) = \quad (7)$$

$$\sum_{j} \alpha(t-1, j)\exp(\eta a_{ji} + z_i(t)) = \exp(z_i(t))\sum_{j}\alpha(t-1, j)\exp(\eta a_{ji})$$

It is initialized as $\alpha(0, i) = \delta(i=B)$ and B is the special symbol for starting of a sentence. At the end of the sentence, the sum of scores for all input-label pair sequence ending at position t and label i is $\alpha(T,i)$. If using a special symbol E for sentence ending, the sum of scores of all input-label pair sequence is given by $\alpha(T, E)$.

A slight modification of the forward pass procedure results in the Viterbi algorithm as $\hat{\alpha}(t,i)=\exp(z_i(t))_{max\forall j}(\hat{\alpha}(t-1,j)\exp(\eta a_{ji}))$.

The backward pass score can be defined as the sum of partial path scores starting at position t−1, with label q and exclusive of observation t−1. It can be recursively computed as:

$$\beta(t-1, q) = \sum_{\forall y(t-1:T) \cap y(t-1)=q} \exp\left(\sum_{k=t,\ldots,T} \eta a_{y(k-1)y(k)} + z_{y(k)}(k)\right) = \quad (8)$$

$$\sum_{j} \beta(t, j)\exp(\eta a_{qj} + z_j(t)).$$

With the above forward and backward scores, gradients with respect to vertex feature $z_{y(t)=k}(t)$ at position t and label y(t)=k can be computed as follows:

$$\frac{\partial Q(\theta)}{\partial z_{y(t)=k}(t)} = \quad (9)$$

$$\delta(y(t) = y^*(t)) - \sum_{\forall y(1:T)} \frac{\exp\left(\sum_t \eta a_{y(t-1)y(t)} + z_{y(t)}(t)\right)\delta(y(t)=k)}{\sum_{\forall y(1:T)} \exp(\sum_t \eta a_{y(t-1)y(t)} + z_{y(t)}(t))} =$$

$$\delta(y(t) = k) - \frac{\alpha(t, k)\beta(t, k)}{\sum_j \alpha(t, j)\beta(t, j)}$$

With the above equation, the error signal for RNN at each position t can be obtained. The model then reuses the back-propagation procedures for updating RNN parameters.

To update the label transition weights, gradients are compute as follows:

$$\frac{\partial Q(\theta)}{\partial a_{ji}} = \eta \sum_t \left( \delta(y(t-1) = j, y(t) = i) - \frac{\alpha(t-1, j)\beta(t, i)\exp(\eta a_{ji} + z_i(t))}{\sum_j \alpha(t, j)\beta(t, j)} \right) \quad (10)$$

The model parameters are updated using stochastic gradient ascent (SGA) over the training data multiple passes. Usually in SGA all model parameters share a global learning rate.

2.0 Exemplary Operating Environments

Figure 8:
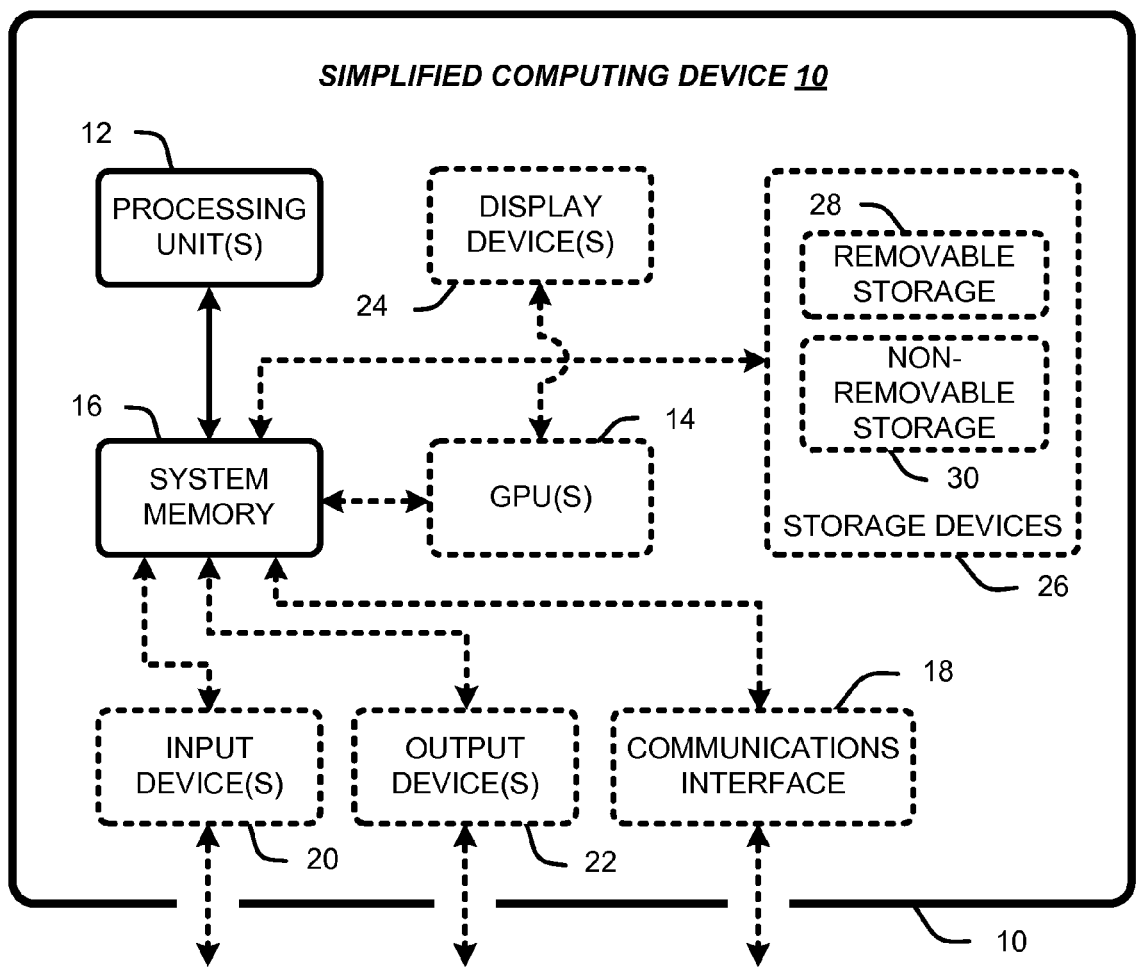
FIG. 8 is a diagram depicting a general purpose computing device constituting an exemplary system for implementing R-CRF embodiments described herein.

The R-CRF embodiments described herein are operational within numerous types of general purpose or special purpose computing system environments or configurations, as indicated previously. FIG. 8 illustrates a simplified example of a general-purpose computer system on which various embodiments and elements of R-CRF, as described herein, may be implemented. It is noted that any boxes that are represented by broken or dashed lines in the simplified computing device 10 shown in FIG. 8 represent alternate embodiments of the simplified computing device. As described below, any or all of these alternate embodiments may be used in combination with other alternate embodiments that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, mini-computers, mainframe computers, and audio or video media players.

To allow a device to implement the R-CRF embodiments described herein, the device should have a sufficient computational capability and system memory to enable basic computational operations. In particular, the computational capability of the simplified computing device 10 shown in FIG. 8 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 shown in FIG. 8 may also include other components such as a communications interface 18. The simplified computing device 10 may also include one or more conventional computer input devices 20 (e.g., pointing devices, keyboards, audio (e.g., voice) input devices, video input devices, haptic input devices, gesture recognition devices, devices for receiving wired or wireless data transmissions, and the like). The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 8 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various R-CRF embodiments described herein, or portions thereof, may be stored, received, transmitted, or read from any desired combination of computer-readable or machine-readable media or storage devices and communication media in the form of computer-executable instructions or other data structures.

Finally, the R-CRF embodiments described herein may be further described in the general context of computer-executable instructions, such as program modules, being executed by a computing device. Generally, program modules include routines, programs, objects, components, data structures, and the like, that perform particular tasks or implement particular abstract data types. The data extraction technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter is not necessarily limited to the specific features or acts described above. Rather, the specific features and acts described above are disclosed as example forms of implementing the claims.

Wherefore, what is claimed is:

1. A language understanding (LU) system, comprising:
a computing device; and
a computer program having program modules executable by the computing device, the computing device being directed by the program modules of the computer program to,
receive feature values corresponding a sequence of words,
generate semantic labels for words in the sequence of words, said semantic label generation comprising using a recurrent conditional random field (R-CRF) comprising,
a recurrent neural network (RNN) portion which generates RNN activation layer activations data that is indicative of a semantic label for a word, the RNN receiving feature values associated with a word in the sequence of words and outputting RNN activation layer activations data that is indicative of a semantic label, and
a conditional random field (CRF) portion which takes as input the RNN activation layer activations data output from the RNN for one or more words in the sequence of words and outputs label data that is indicative of a separate semantic label that is to be assigned to each of the one or more words in the sequence of words associated with the RNN activation layer activations data, and
assign each semantic label corresponding to the data output by the CRF portion of the R-CRF to the appropriate one said one or more words in the sequence of words.

2. The system of claim 1, wherein the RNN activation layer activations data comprises data output by the activation layer of the RNN prior to any softmax normalization.

3. The system of claim 1, wherein the RNN and CRF portions of the R-CRF are jointly trained using a set of training data pair sequences and a CRF sequence-level objective function, each of said training data pair sequences comprising a sequence of pairs of feature values corresponding to a word and label data that is indicative of a correct semantic label for that word.

4. The system of claim 1, wherein the RNN portion of the R-CRF comprises:
an input layer of nodes wherein each feature value of the feature values associated with a word are input into a different one of the input layer nodes;
a hidden layer comprising nodes that are connected to outputs of the input layer, each connection between the input layer and hidden layer being adjustably weighted; and
an activation layer comprising nodes that are connected to outputs of the hidden layer, each connection between the hidden layer and activation layer being adjustably weighted, and wherein outputs of the activation layer are connected to inputs of the CRF portion of the R-CRF.

5. The system of claim 4, wherein the feature values associated with a word form a multi-dimensional input vector having a number of elements equal to or larger than a size of a vocabulary of words, and wherein the input layer of nodes comprises a different node for each element of the input vector.

6. The system of claim 4, wherein the label data output from the CRF portion of the R-CRF forms a multi-dimensional output vector having a number of elements equal to a number of possible semantic labels, and wherein the CRF portion of the R-CRF comprises output nodes equaling the number of output vector elements and a different output node of which is dedicated to each different element of the output vector.

7. The system of claim 4, wherein the RNN activation layer activations data output from the RNN portion of the R-CRF in response to the input of feature values associated with a word in the sequence of words is input into the nodes of the hidden layer along with the data output from the input layer upon input of feature values associated with a next word in the sequence of words input into the input layer.

8. The system of claim 7, wherein RNN activation layer activations data input into the nodes of the hidden layer is adjustably weighted prior to input.

9. The system of claim 4 wherein the hidden layer is fully-connected to the input layer and activation layer such that each node of the hidden layer is connected to each node of the input layer and each node of the activation layer.

10. The system of claim 4, wherein the RNN portion of the R-CRF further comprises a feature layer which is used to input ancillary information into the RNN portion, said feature layer being comprised of nodes which input ancillary information values and output representative ancillary data, wherein an output of each of said feature layer nodes is connected to an input of each hidden layer node via a weighted hidden layer connection and to an input of each activation layer node via a weighted activation layer connection.

11. The system of claim 4, wherein the RNN portion of the R-CRF further comprises one or more additional hidden layers, each additional hidden layer being fully connected to the layer preceding the additional hidden layer and the layer subsequent to the additional hidden layer such that each node of the additional hidden layer is connected to each node of the preceding layer and each node of the subsequent layer.

12. A recurrent conditional random field (R-CRF), comprising:
a recurrent neural network (RNN) portion which generates RNN activation layer activations data that is indicative of a label for a word, the RNN receiving feature values associated with a word in the sequence of words and outputting RNN activation layer activations data that is indicative of a label, said RNN portion comprising,
an input layer of nodes wherein each feature value of the feature values associated with a word are input into a different one of the input layer nodes,
a hidden layer comprising nodes that receive outputs from the input layer, said outputs from the input layer being adjustably weighted, and
an activation layer comprising nodes that receive outputs from the hidden layer, said outputs from the hidden layer being adjustably weighted; and
a conditional random field (CRF) portion which takes as input the RNN activation layer activations data output from the activation layer of the RNN portion for words in the sequence of words and which outputs label data that is indicative of a separate label that is to be assigned to each of the words in the sequence of words associated with the RNN activation layer activations data.

13. The R-CRF of claim 12, wherein the RNN activation layer activations data comprises data output by the activation layer of the RNN prior to any softmax normalization.

14. The R-CRF of claim 12, wherein the RNN and CRF portions of the R-CRF are jointly trained using a set of training data pair sequences and a CRF sequence-level objective function, each of said training data pair sequences comprising a sequence of pairs of feature values corresponding to a word and label data that is indicative of a correct label for that word.

15. The R-CRF of claim 12, wherein the RNN activation layer activations data output from the RNN portion of the R-CRF in response to the input of feature values associated with a word in the sequence of words is input into the nodes of the hidden layer along with the data output from the input layer upon input of feature values associated with a next word in the sequence of words input into the input layer.

16. The R-CRF of claim 15, wherein RNN activation layer activations data input into the nodes of the hidden layer is adjustably weighted prior to input.

17. The R-CRF of claim 12, wherein the RNN portion of the R-CRF further comprises a feature layer which is used to input ancillary information into the RNN portion, said feature layer being comprised of nodes which input ancillary information values and output representative ancillary data, wherein an output of each of said feature layer nodes is input into each hidden layer node via a weighted hidden layer connection and input into each activation layer node via a weighted activation layer connection.

18. The R-CRF of claim 12 wherein the hidden layer is fully-connected to the input layer and activation layer such that each node of the hidden layer is connected to each node of the input layer and each node of the activation layer.

19. A computer-implemented process for training a recurrent conditional random field (R-CRF) to output semantic label designations for words in a sequence of words, said R-CRF comprising a recurrent neural network (RNN) portion which outputs RNN activation layer activations data that is indicative of a semantic label for a word in response to feature values associated with that word in the sequence of words being input and which comprises a series of interconnected multi-node layers having weighted connections between layers, and a conditional random field (CRF) portion which takes as input the RNN activation layer activations data output from the RNN portion for one or more words in the sequence of words and then outputs label data that is indicative of a separate semantic label that is to be assigned to each of the one or more words in the sequence of words, said training process comprising:
using a computing device to perform the following process actions:
accessing a set of training data pair sequences, each of said training data pair sequences comprising a sequence of pairs of feature values corresponding to a word and label data that is indicative of a correct semantic label for that word;
inputting each training data pair sequence of said set one by one into the R-CRF; and
for each training data pair sequence input into the R-CRF, employing a CRF sequence-level objective function and a backpropagation procedure to compute adjusted weights for the connections between layers of the RNN portion of the R-CRF, and
changing the weight associated with the connections between layers of the RNN portion of the R-CRF based on the computed adjusted weights.

20. The process of claim 19, wherein the CRF sequence-level objective function takes the form of $$\frac{\exp\sum_{t=1}^{T}(\eta a_{y^*(t-1)y^*(t)} + z_{y^*(t)}(t))}{\sum_{\forall y(1:T)}\exp\left(\sum_{t=1}^{T}\eta a_{y(t-1)y(t)} + z_{y(t)}(t)\right)},$$

wherein y(1:T)=[y (1) . . . y (T)] denotes label sequences, y*(1:T)=[y*(1) . . . y*(T)] denotes the correct label sequence, $\eta \in R^+$ is a real value, $a_{y(t-1)y(t)}$ is a transition factor between the label of the sequence currently being considered and the previous label in the sequence, $a_{y^*(t-1)y^*(t)}$ is a transition factor between the label of the correct sequence currently being considered and the previous label in the correct sequence, $z_{y(t)}(t)$ is the RNN activation layer activations data output by the RNN portion in response to the input of feature values associated with a word, and $z_{y^*(t)}(t)$ is the RNN activation layer activations data output by the RNN portion in response to the input of feature values associated with the word corresponding to the label of the correct sequence currently being considered.

* * * * *